United States Patent
Clements et al.

(10) Patent No.: US 9,878,677 B2
(45) Date of Patent: Jan. 30, 2018

(54) APPARATUS, SYSTEMS AND METHODS RELATING TO SLIDING DASH ASSEMBLIES

(71) Applicant: Winnebago Industries Inc., Forest City, IA (US)

(72) Inventors: Matthew Clements, Clive, IA (US); Steven Jergenson, Clear Lake, IA (US); Craig Casanova, Albert Lea, MN (US); Bob Ritter, Clear Lake, IA (US)

(73) Assignee: Winnebago Industries, Inc., Forest City, IA (US)

( * ) Notice: Subject to any disclaimer, the term of this patent is extended or adjusted under 35 U.S.C. 154(b) by 168 days.

(21) Appl. No.: 14/941,261

(22) Filed: Nov. 13, 2015

(65) Prior Publication Data

US 2016/0068113 A1 Mar. 10, 2016

Related U.S. Application Data

(63) Continuation of application No. 14/208,826, filed on Mar. 13, 2014, now Pat. No. 9,205,784.

(60) Provisional application No. 61/789,088, filed on Mar. 15, 2013.

(51) Int. Cl.
*B60R 7/06* (2006.01)
*B60R 11/02* (2006.01)
*B60R 11/00* (2006.01)

(52) U.S. Cl.
CPC ............ *B60R 11/0235* (2013.01); *B60R 7/06* (2013.01); *B60R 11/02* (2013.01); *B60R 2011/0005* (2013.01); *B60R 2011/0061* (2013.01); *B60R 2011/0084* (2013.01); *B60R 2011/0092* (2013.01)

(58) Field of Classification Search
CPC ... B60R 7/06; B60R 11/02; B60R 2011/0005; B60R 2011/0042; B60R 2011/0047; B60R 2011/008; B60R 2011/0092; B60R 2011/0084; B60R 11/0229
USPC .......................................................... 224/482
See application file for complete search history.

(56) References Cited

U.S. PATENT DOCUMENTS

| | | | | |
|---|---|---|---|---|
| 4,079,604 A * | 3/1978 | Anderegg | ........................ | 70/58 |
| 4,105,246 A * | 8/1978 | Trumbull | ..................... | 296/97.7 |
| 5,025,919 A * | 6/1991 | Brinker et al. | ............... | 206/214 |
| 5,779,205 A * | 7/1998 | Ching | ........................ | 248/205.8 |
| 5,833,101 A * | 11/1998 | Watkins | ........................ | 224/275 |
| 5,979,724 A * | 11/1999 | Loewenthal et al. | ......... | 224/483 |
| 6,116,485 A * | 9/2000 | Watkins | ........................ | 224/275 |
| 6,131,986 A * | 10/2000 | Rosen | ........................ | 296/97.13 |
| 6,155,525 A * | 12/2000 | Joanisse et al. | ........... | 248/287.1 |
| 6,381,133 B1 * | 4/2002 | Chen | ........................ | 361/679.42 |
| 6,705,690 B1 * | 3/2004 | O'Brien | ..................... | 312/334.6 |
| 7,143,805 B1 * | 12/2006 | Weir | ........................ | 160/370.22 |
| 7,431,376 B1 * | 10/2008 | Marszalek | ................... | 296/97.7 |
| 7,591,498 B2 * | 9/2009 | Busha et al. | ................ | 296/24.34 |
| 7,950,610 B2 * | 5/2011 | Sawai | ........................... | 248/131 |
| 8,072,743 B2 * | 12/2011 | Kissel | ...................... | 361/679.21 |
| 8,649,161 B2 * | 2/2014 | Kato | ........................ | 361/679.01 |
| 2008/0041540 A1 * | 2/2008 | Li | ........................... | 160/370.22 |
| 2009/0230262 A1 * | 9/2009 | Chiu | | |

(Continued)

*Primary Examiner* — Brian D Nash
(74) *Attorney, Agent, or Firm* — Faegre Baker Daniels LLP

(57) ABSTRACT

The sliding display device system is a device for mounting a display devices in a recreational vehicle that allows for easy repositioning of the display device along a horizontal axis between the driver and passenger side.

16 Claims, 12 Drawing Sheets

(56) References Cited

U.S. PATENT DOCUMENTS

| | | | |
|---|---|---|---|
| 2012/0199621 A1* | 8/2012 | Yoon | 224/483 |
| 2014/0138418 A1* | 5/2014 | Dunn | 224/483 |
| 2014/0183238 A1* | 7/2014 | Lin | 224/483 |
| 2014/0223065 A1* | 8/2014 | Jolda et al. | 710/303 |
| 2014/0246468 A1* | 9/2014 | Montgomery et al. | 224/548 |

* cited by examiner

SECTION D-D

SECTION E-E

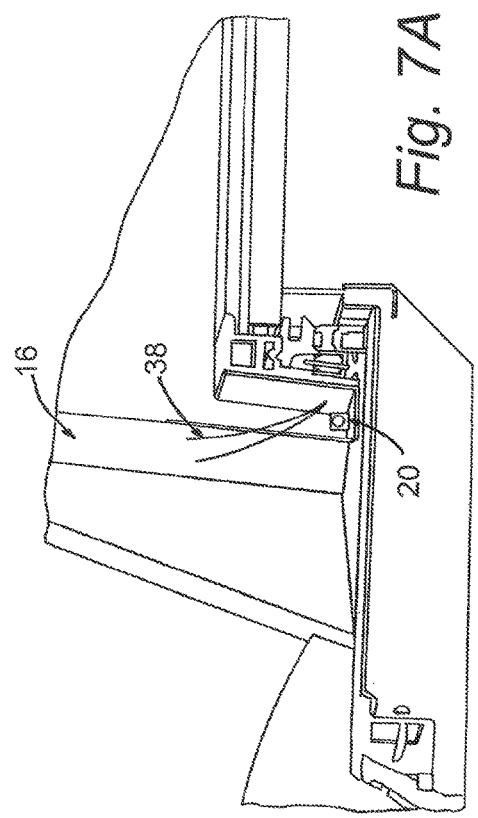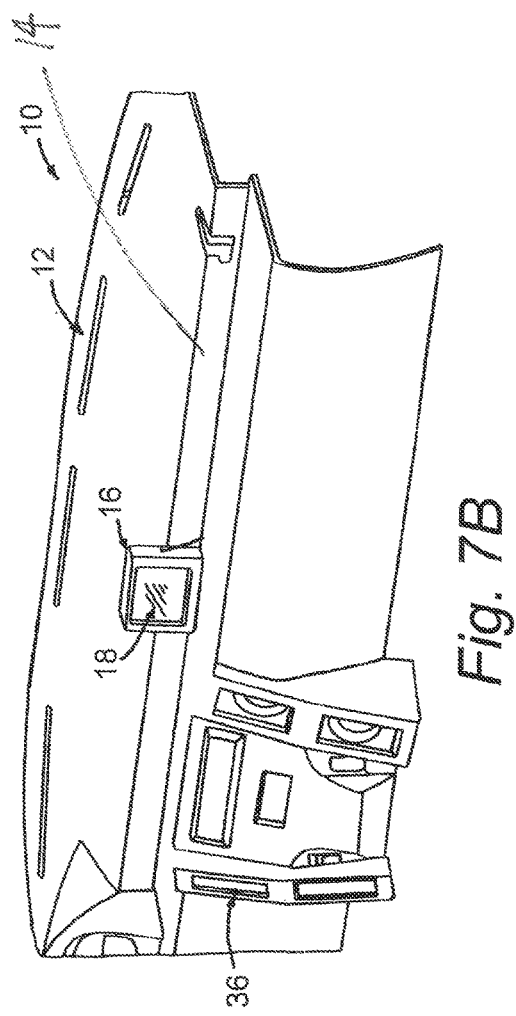

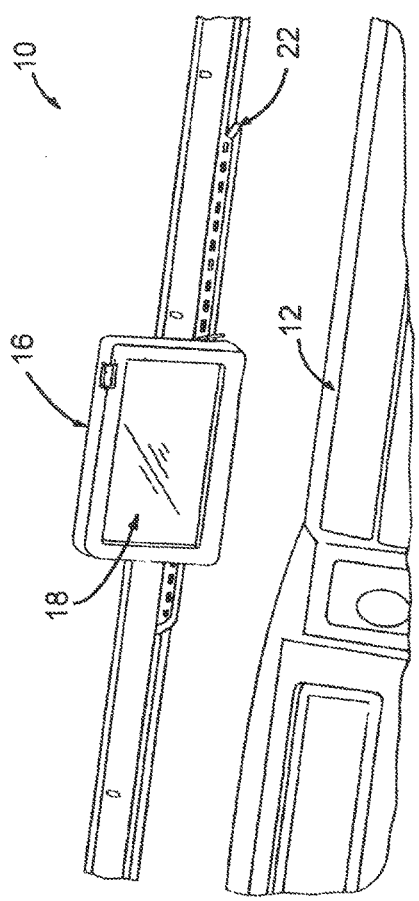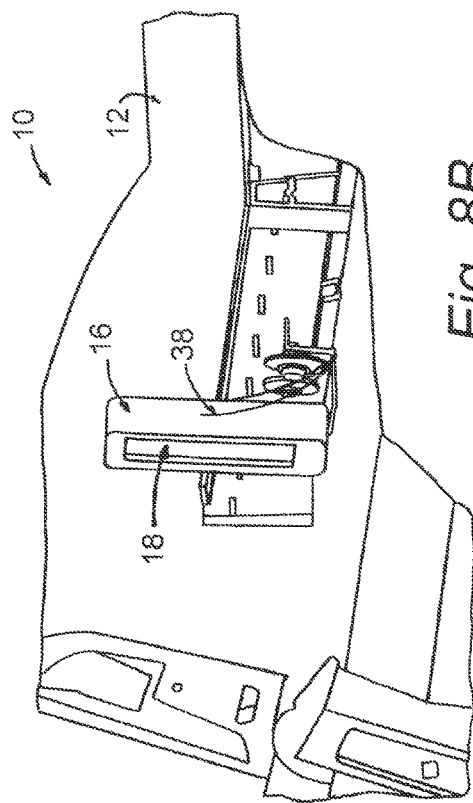

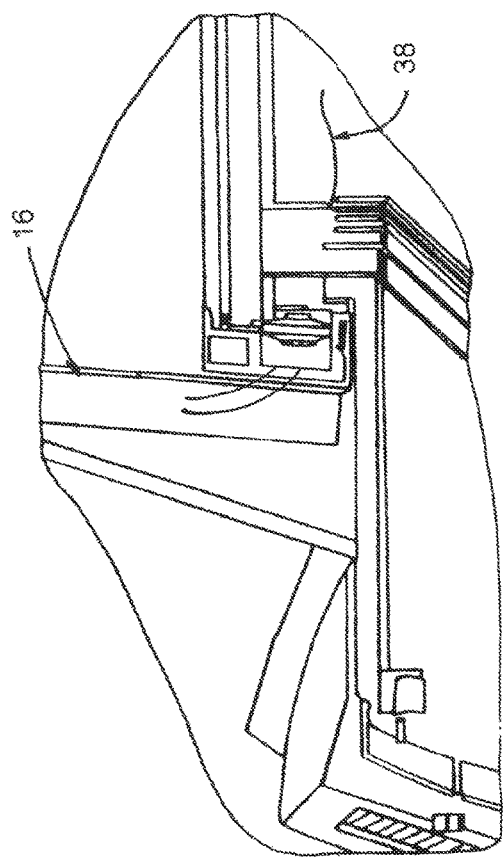
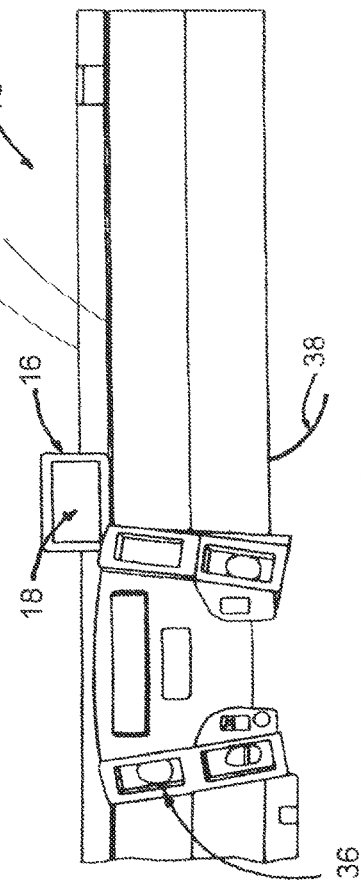
Fig. 9A
Fig. 9B

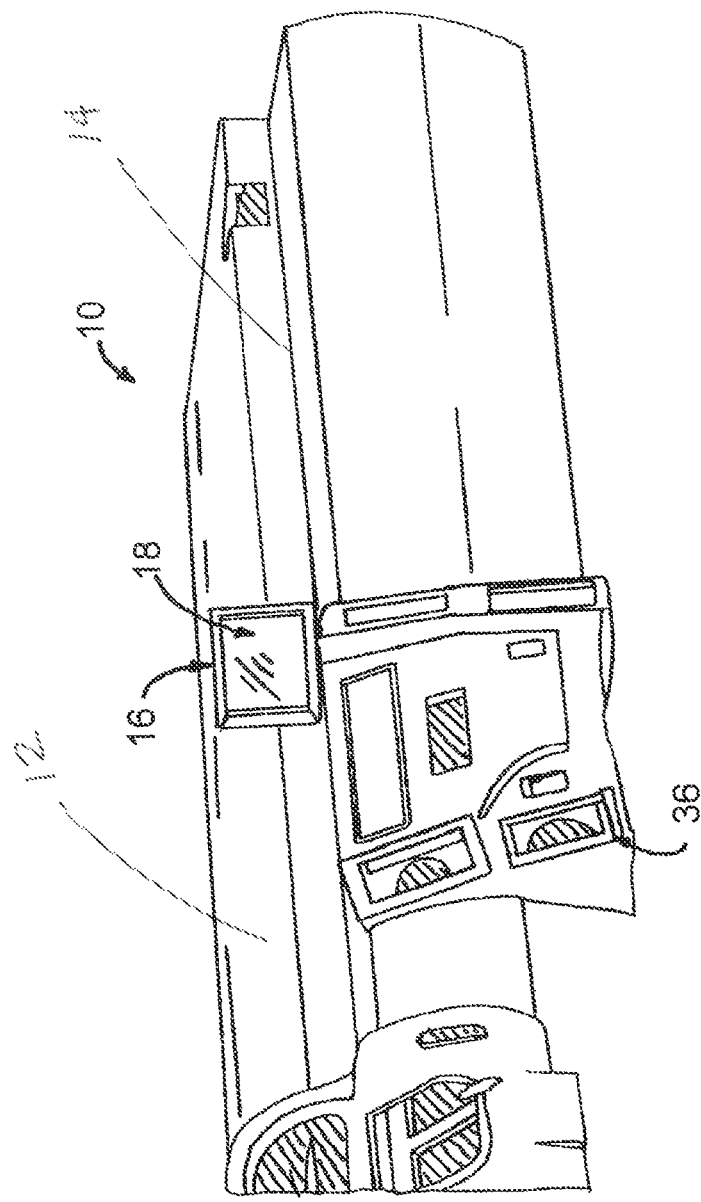

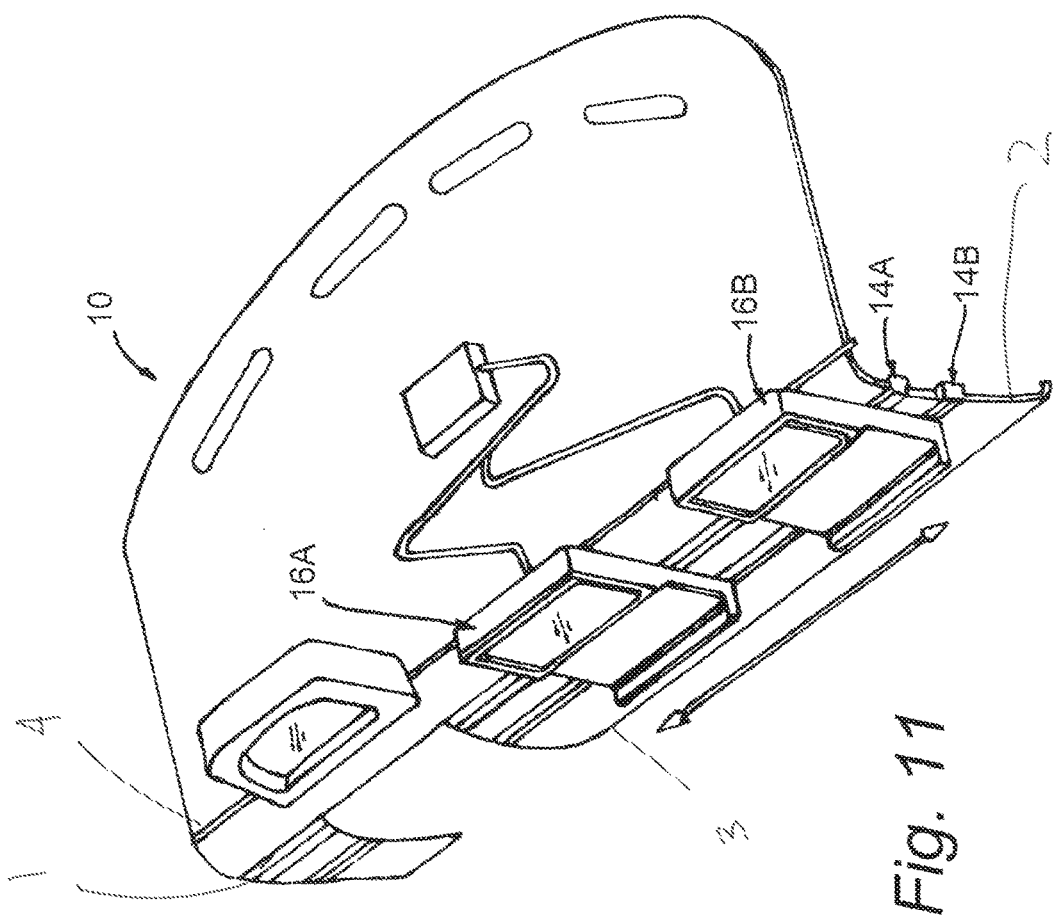

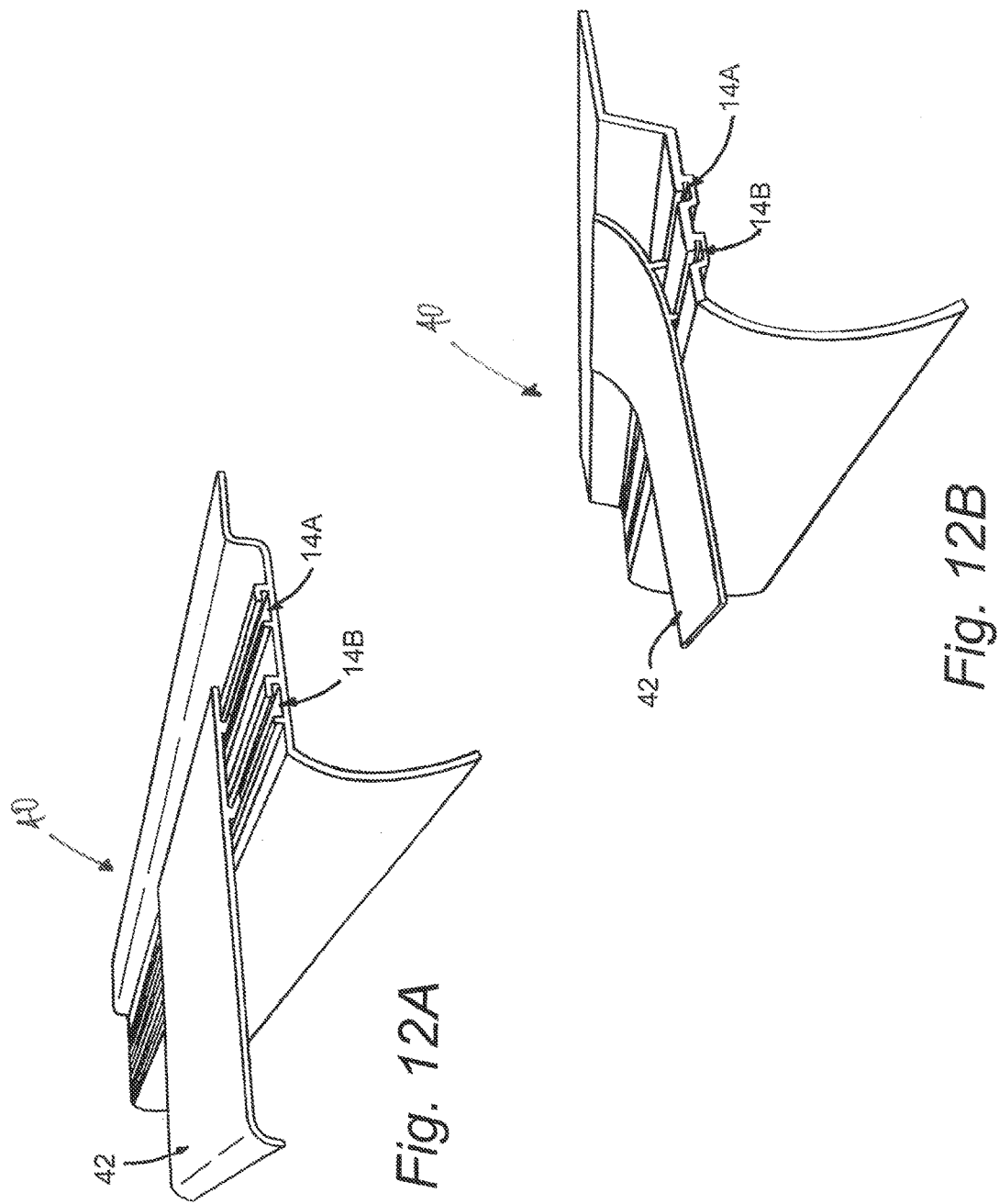

APPARATUS, SYSTEMS AND METHODS RELATING TO SLIDING DASH ASSEMBLIES

CROSS-REFERENCE TO RELATED APPLICATION(S)

This application is a continuation of U.S. application Ser. No. 14/208,826, filed Mar. 13, 2014 and entitled "Dash Dock and Cradle Design," now U.S. Pat. No. 9,205,784, which claims priority from U.S. Provisional Application 61/789,088, filed Mar. 15, 2013, and entitled "Dash Dock and Cradle Design," both of which are hereby incorporated herein by reference in their entirety.

FIELD

The present invention relates to display device dock systems for recreational vehicles.

BACKGROUND

As people become more mobile and spend a greater amount of time traveling and away from home, demand rises for electronic devices that can be used outside the home environment. Tablet computers including a large display screen and a touch screen interface are becoming more prevalent in today's society due to the ease in which they can be used on the go. Because using a tablet computer in a vehicle may be cumbersome, numerous devices have been developed to fixedly display a tablet in a vehicle such as mounts for a dashboard or the rear of a seat. Yet when it comes to using a display in recreation vehicle, these prior art solutions have significant problems. Because these vehicles tend to be very wide (a Class A coach is 96" across), it is difficult to mount a tablet in one spot on a dashboard that can be easily seen or accessed by both the driver and the passenger. For example, if a tablet is mounted halfway between the driver and passenger it may be difficult for the driver to see a map needed for navigation. And likewise, it may be difficult for the passenger to clearly see a movie being displayed. Accordingly, there is a need in the art for a mount that can be positioned between the driver and passenger depending on required use of the tablet.

BRIEF SUMMARY

The present invention is an apparatus for slidably mounting an display device such as a tablet computer, iPad®, or information center (having backup monitor, GPS and the like) in a recreational vehicle or other large vehicle so that the position of the mounted device can be easily adjusted in a horizontal direction between the passenger and driver.

In one embodiment, a slidable mounting apparatus for a vehicle has at least one slide groove assembly fixedly attached to a vehicle and at least one mounting assembly, wherein the mounting assembly further comprises at least one trolley assembly; and the trolley assembly is slidably connected to the slide groove assembly.

In another embodiment, the mounting assembly is a display device mounting assembly and the display device mounting assembly further comprises a display device mounting bracket fixedly attached to the trolley assembly for securing a display device to the bracket.

In still another embodiment, the mounting assembly is a work station, wherein the work station further comprises a work surface and the work surface fixedly connected to the trolley assembly.

In still a further embodiment, the trolley assembly further comprises at least one friction reduction member, wherein the friction reduction member is a wheel, bearing, low friction nylon/plastic, or other means known in the art of reducing friction between moving parts.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 7A is a side view of an exemplary embodiment showing the display device mount and the slide groove and wiring.

FIG. 7B is a further perspective view of a further embodiment showing the display device mount and dash.

FIG. 8A is a cutaway view of an exemplary embodiment showing the display mounting device and chain.

FIG. 8B is a perspective side view of an exemplary embodiment showing the display device mount and the chain system and wiring.

FIG. 9A is a side view of an exemplary embodiment showing the display device mount and the slide groove and wiring.

FIG. 9B is a further perspective view of a further embodiment showing the display device mount and dash.

FIG. 10 is a further interior perspective view of the dash mounted system.

FIG. 11 depicts a perspective view of an exemplary embodiment of the system comprising multiple display devices.

FIG. 12A depicts a perspective view of an alternate embodiment of the system configured as a workstation.

FIG. 12B depicts a perspective view of an alternate workstation embodiment.

DETAILED DESCRIPTION

The various systems and devices disclosed herein relate to apparatus, systems and method for use in recreational vehicles. More specifically, various embodiments relate to various apparatus, systems and methods for adjusting the position of certain components, namely a dash display device. Although the sliding display device system has been described with reference to certain exemplary embodiments, persons skilled in the art will recognize that changes may be made in form and detail without departing from the spirit and scope of the apparatus, systems and methods.

Exemplary embodiments of the apparatus, systems and methods comprise a sliding dash system and slidable mounting apparatus for a recreational vehicle, which for brevity will be referred to herein as the "dash system."

Figure 1:
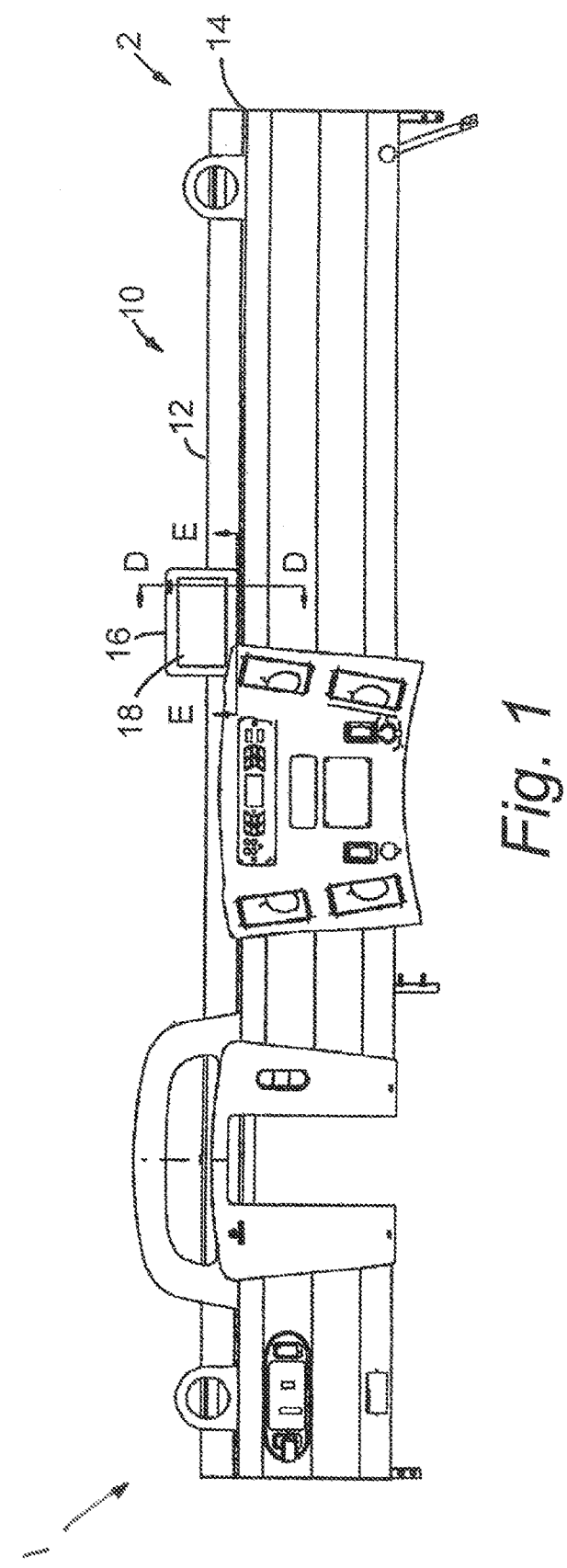
FIG. 1 is a front view of one implementation of the sliding display device system.

Turning to the drawings in greater detail, FIG. 1 depicts an exemplary embodiment of the sliding in-dash system 10. In these embodiments, a vehicle dashboard 12 is shown having one or more slide grooves 14 running substantially horizontally along the dashboard 12. The embodiment further comprises one or more display device mounting, or trolley assembly 16. The trolley assembly 16 further comprises one or more brackets 20 configured to hold a display device (as described in detail in reference to FIG. 2, which is the cross-section of section D-D).

In certain exemplary embodiments, a display device 18 may be placed or otherwise secured to the trolley assembly 16. In certain embodiments, a display device 18 is simply placed on the trolley assembly 16, but in other embodiments, the display device 18 is secured to the trolley assembly 16, such as through brackets (shown at 20 in FIG. 2), clips, adjustable components or other means known in the art.

In certain implementations, the display device 18 can be fully or partially integrated with the vehicle electrical system, such as a touch-screen control mechanism, radio, GPS display, map display, music or satellite radio control device, mapping device, climate control device, vehicle control mechanism, reverse camera display, a tablet computer such as an iPad®, a laptop computer, a digital music player, or any of a variety of electronic components, either of the consumer electronic or vehicle electronic varieties. In certain embodiments, brackets 20 are affixed directly from the display device 18 to the trolley assembly 16. The trolley assembly 16 is in turn slidably connected to the slide grooves 14 such that the display device 18 can be made to slide horizontally from the driver side (generally at 1) to the passenger side (generally at 2), as described elsewhere herein.

Figure 2:
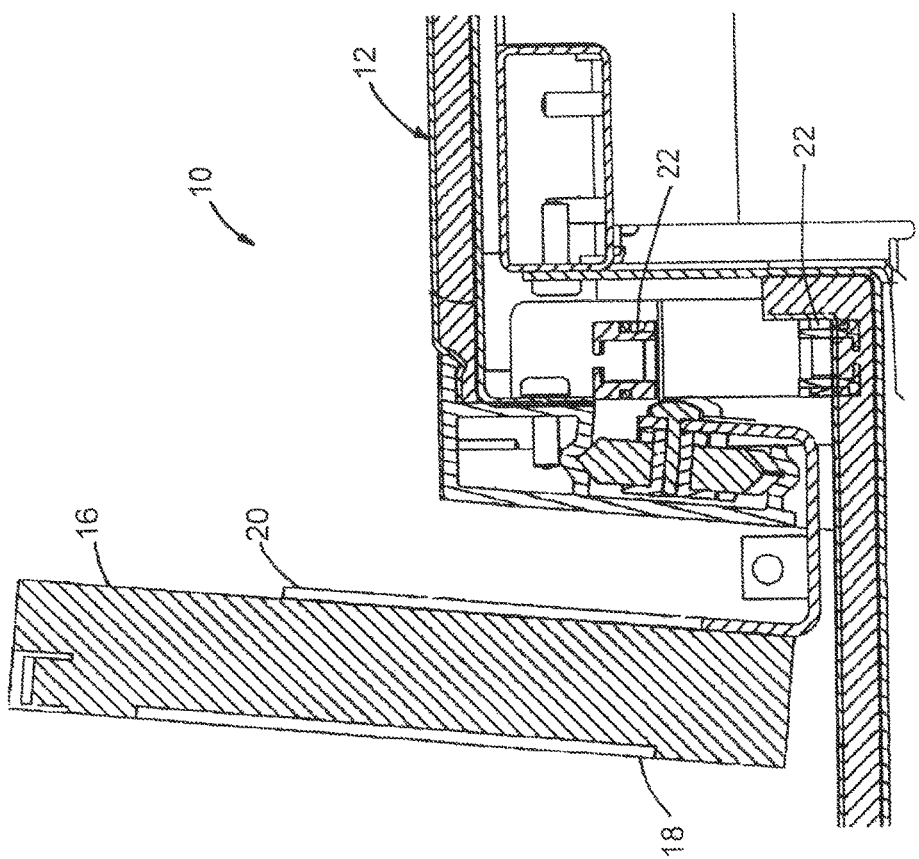
FIG. 2 is a cross-sectional view of the implementation of FIG. 1 from along lines D-D.
Figure 3:
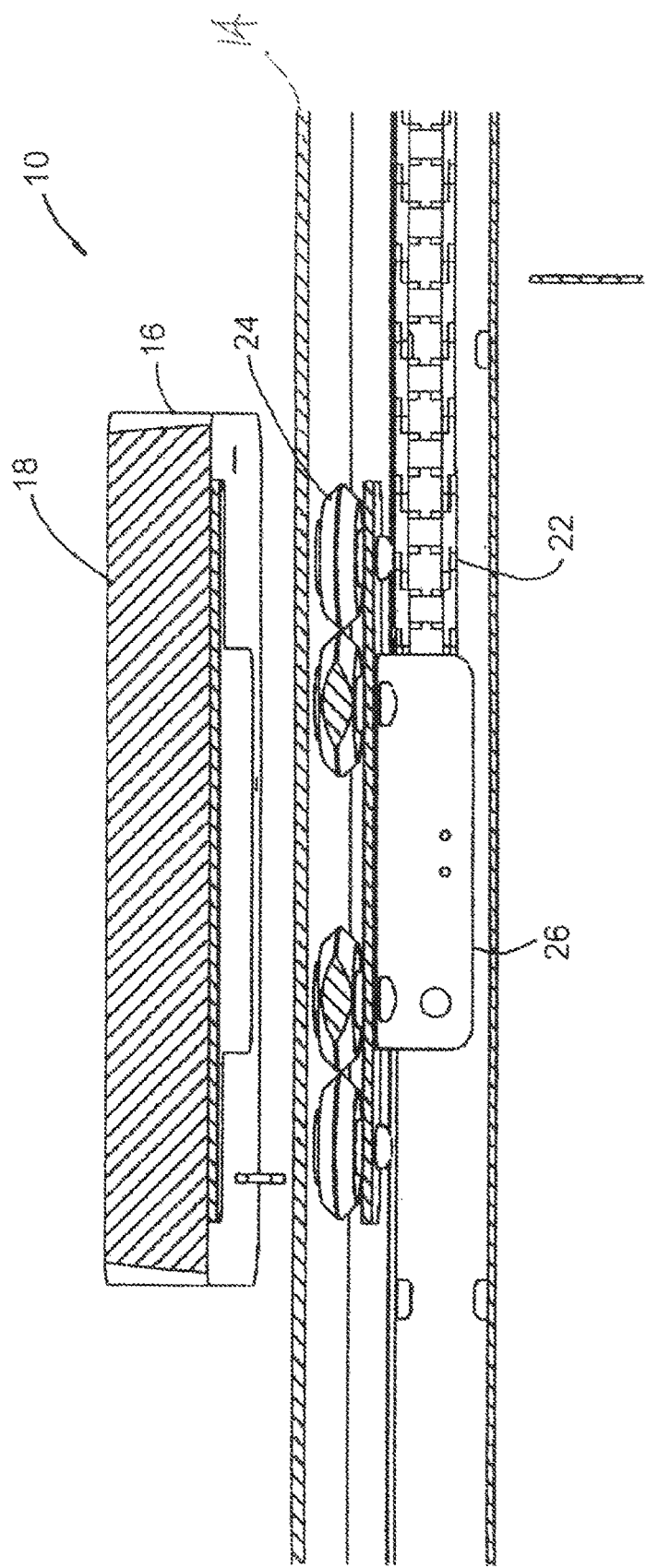
FIG. 3 is a bottom view of the implementation of FIG. 1 from the point of view of reference letter E.
Figure 4:
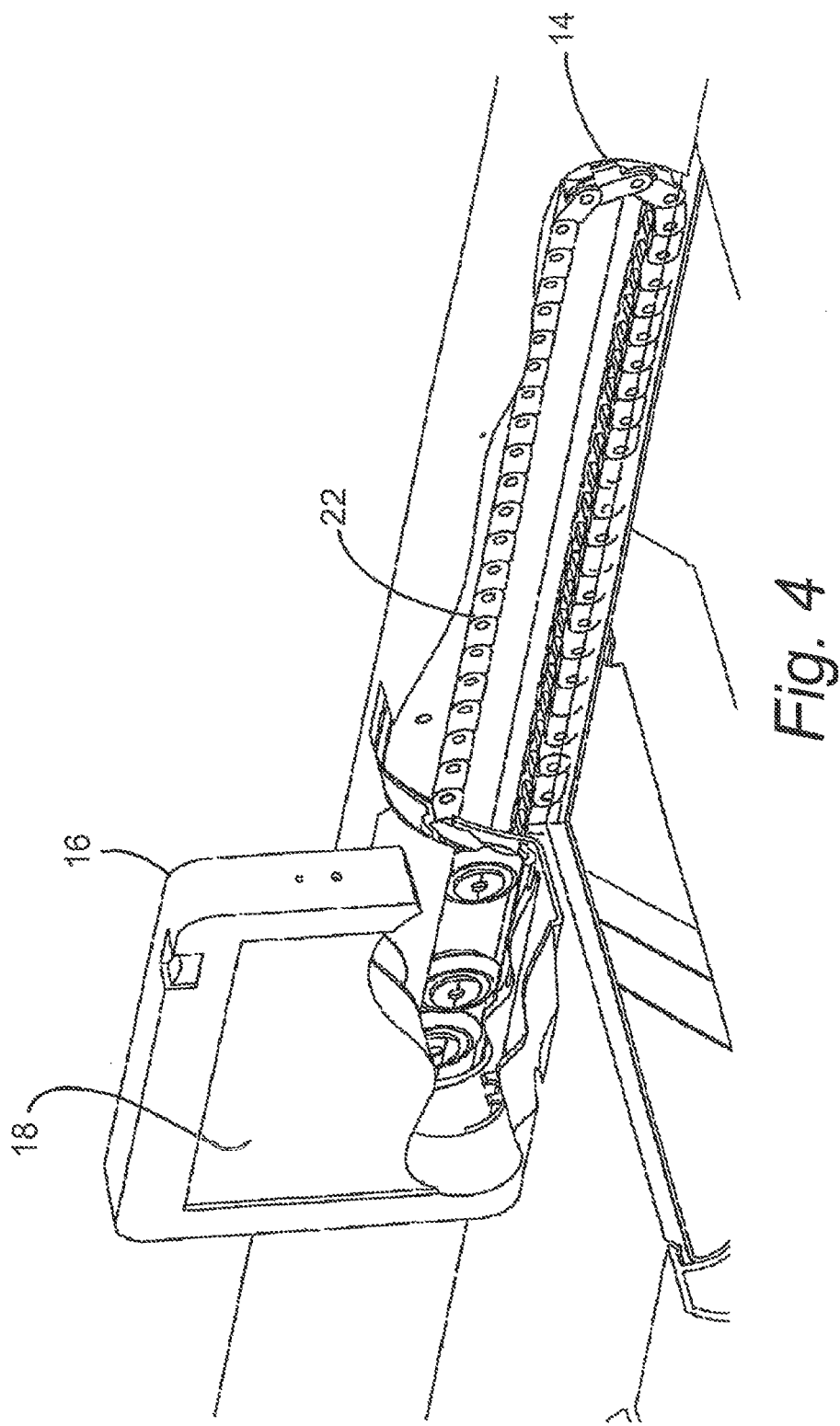
FIG. 4 is a perspective cutaway view of an exemplary embodiment of the system showing the chain system.

FIG. 2 is a cross-sectional view of segment D-D in FIG. 1, showing an exemplary embodiment of the of the sliding dash system 10. As is shown in FIG. 3-4, certain exemplary embodiments further comprise a "caterpillar," or chain system 22 to facilitate movement of the display device 18 along the slide grooves 14. In certain of these embodiments, the chain system 22 is configured to organize cords used to power the device or to use the device as an auxiliary input into the vehicles in-dash sound system. The chain system further allows smooth movement of the display device without cord bunching.

In certain implementations, the system comprises one or more slide grooves 14 and the trolley assembly 16 further comprises wheels 24, bearings, low resistance nylon/plastic-type material or other materials know in the art that reduce friction between the slide grooves 14 and the trolley assembly 16 during operation to facilitate sliding in a generally horizontal direction.

FIG. 3 depicts a bottom-view of the sliding in-dash system 10 from segment E-E. In certain embodiments, the system 10 comprises a chain connection member 26, which operationally couples the trolley 16 with the chain system 22.

FIG. 4 depicts a cutaway view of an embodiment of the system comprising the caterpillar or chain system 22. In certain embodiments, the chain system 22 is powered by a driven gear (not shown) to control the movement of the trolley 16 about the slide groove, for example to move from the driver side 1 to the passenger side 2. In alternate embodiments, the chain system 22 is passively movable by the user, such as by hand. In yet further embodiments, the chain system 22 is functionally coupled to a locking mechanism. The slide grooves 14 can be manufactured by a number of means known in the art. For example, slide grooves 14 could be manufactured through extrusion. Other manufacturing methods are possible. The slide grooves may be manufactured from a number of materials such as plastic or metal. Other materials are possible.

Figure 5:
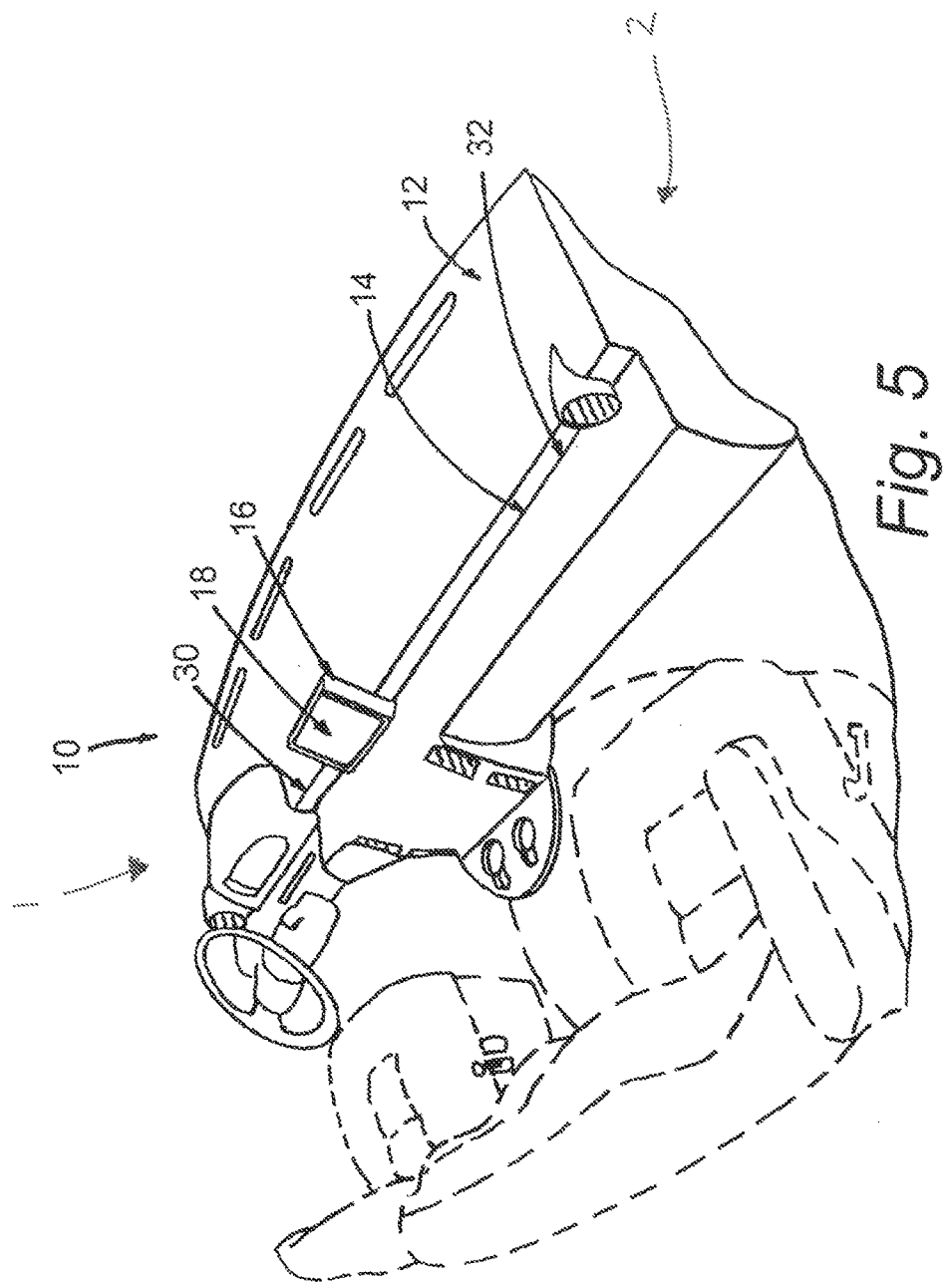
FIG. 5 is a perspective view of the interior of a recreational vehicle showing of an exemplary implementation of the display device mounting assembly.

FIG. 5 depicts a further example of an exemplary embodiment of the sliding in-dash system 10. In these embodiments, a slide groove 14 runs substantially horizontally across the vehicle dashboard 12 substantially from the from the driver side 1 to the passenger side 2. In these embodiments, the dashboard 12 is slidably connected to the trolley assembly 16 secured to a display device 18. In certain implementations, the trolley assembly 16 is obscured from the user's view by the display device, and in further embodiments the trolley assembly is prominently visible to the user, depending on the configuration or type of display device being used, as discussed elsewhere herein.

Figure 6:
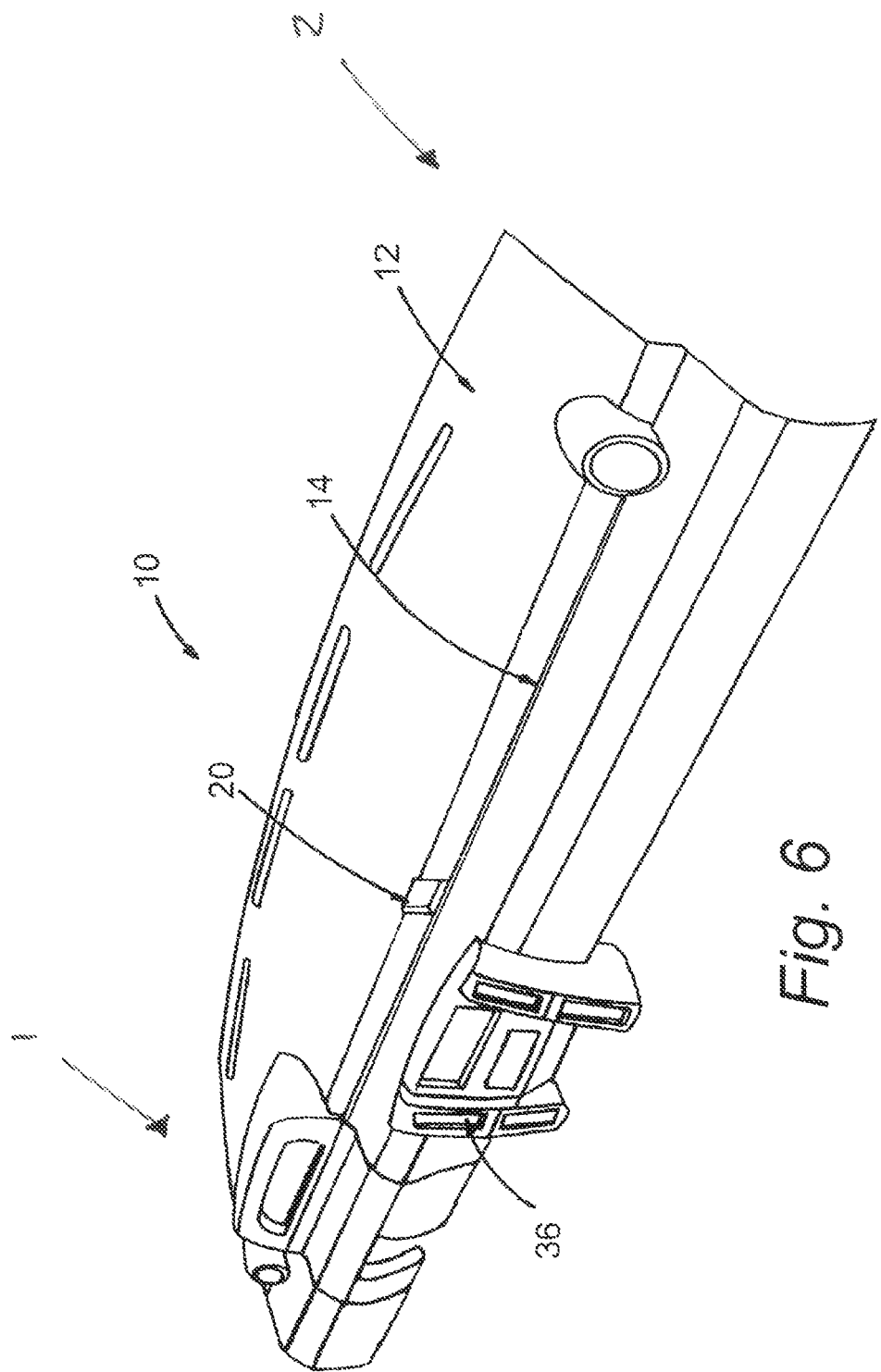
FIG. 6 is a perspective view of the interior of a recreational vehicle showing of an exemplary implementation of the display device mounting system prior to complete assembly of the vehicle.

In yet further implementations, the slide groove 14 further comprise one or more stop members at either end 30, 32, such that horizontal movement of the trolley assembly 16 will be stopped once it reaches either end 30, 32. As shown in FIG. 6, in certain of these embodiments the trolley assembly 16 further comprises at least one bracket 20 extending outside of the slide groove 14.

FIGS. 7A-10 depict various exemplary embodiments of the system 10. FIGS. 7A-B depict cross-sectional and perspective views, respectively, of an exemplary embodiment of the sliding in-dash system 10. As shown in FIG. 7B, the dashboard 12 further comprises an control center 36. In certain of these exemplary embodiments, the control center is in electrical or operational communication with the display device 18. In certain of these embodiments, this communication is by way of wiring 38 (as shown in FIG. 7A), as would be apparent to one of skill in the art. In certain alternate embodiments, the wiring 38 places the system in communication with other electronics, such as a remote hard drive or other processor (not shown).

FIGS. 8A-8B depict views of an alternative embodiment of the sliding in-dash system 10 comprising wiring 38 extending from the trolley assembly 16 into the dashboard 12. FIGS. 9A-9B depict further views of the control center 36, wiring 38, trolley assembly 16 and display device 18, according to an exemplary embodiment. FIG. 10 depicts yet another view of the dashboard comprising the trolley assembly 16, display device 18 and control center 36.

As depicted in FIG. 11, certain embodiments of the system 10 comprise a plurality of trolleys 16A, 16B. In certain embodiments, the system 10 also comprises a plurality of slide grooves 14A, 14B. In certain of these embodiments, the first groove 14A is located on substantially the top of the center stack of dashboard 12 and the second groove 14B located on substantially the bottom of the center stack of the dashboard 12. The display device 18 mounting assembly extends from the top 3 to the bottom 4 of the face of the dashboard and moves horizontally from the driver side 1 to the passenger side 2.

FIGS. 12A-12B depict certain alternate embodiments of the sliding in-dash system 10 further comprising a workstation assembly 40. In these embodiments, the workstation assembly 40 further comprises a work surface 42 to allow for the placement of a laptop computer, iPad, book, or other personal electronic device, or to perform work requiring a hard flat surface. In certain embodiments, the workstation assembly 40 further comprises one or more trolley assemblies fixedly connected to the work surface 42. In exemplary implementations, one or more workstation assemblies and one or more display device mounting assemblies are each slidably connected to the slide grooves 14A, 14B which may be useful if, for example, the driver required use of a tablet for navigation while simultaneously, the passenger required a work surface 42 to work on a laptop computer. In certain embodiments, the slide grooves 14A, 14B protrude upwards from the surface of the dashboard. In this embodiment, a workstation assembly 40 is slidably connected to two slide grooves 14A, 14B. In certain embodiments the ends of the slide grooves 14A, 14B are open to allow the user to slide the trolley assemblies 16A, 16B of the workstation assembly 40 into the slide grooves when a work surface is required yet also to allow for removal of the work station assembly when it is no longer needed. Alternatively, a workstation could be replaced with a display device mounting assemblies when the user wished to view a display device rather than utilize a work surface.

While the various systems in accordance with the present disclosure have been described as being used in connection with recreational vehicle applications, it is envisioned that the present systems disclosed may be used in other applications as well. It is understood that various modifications may be made to the embodiments of the presently disclosed sliding dash system. Therefore, the above description should not be construed as limiting, but merely illustrative of the variations described herein. It is also understood by one of skill in the art that this invention is useful for wide body vehicles in general, including commercial and noncommercial vehicles.

We claim:

1. A recreational vehicle comprising:
   a dashboard comprising at least one slide groove comprising a first end and a second end;
   a trolley assembly comprising a mounting assembly; and
   a chain assembly, wherein the chain assembly is configured to shuttle the trolley assembly along the slide groove between the first end and the second end.

2. The recreational vehicle of claim 1, further comprising a workstation assembly connected to the slide groove.

3. The recreational vehicle of claim 2, wherein the workstation includes a work surface.

4. The recreational vehicle of claim 1, further comprising a chain connection member coupling the trolley assembly to the chain assembly.

5. The recreational vehicle of claim 1, further comprising an electrical connection coupled to the trolley assembly.

6. The recreational vehicle of claim 1, further comprising a display device coupled to the trolley assembly.

7. The recreational vehicle of claim 6, further comprising a control center electrically coupled to the display device.

8. The recreational vehicle of claim 1, further comprising a bracket configured to be connected to the trolley assembly.

9. The recreational vehicle of claim 1, further comprising a friction reduction mechanism configured to reduce friction between the trolley assembly and the slide groove.

10. The recreational vehicle of claim 9, wherein the friction reduction mechanism is either a wheel or a bearing.

11. The recreational vehicle of claim 9, wherein the friction reduction mechanism comprises one of low-resistance nylon, plastic, and grease.

12. A recreational vehicle comprising:
    a dashboard comprising:
      a slide groove extending along at least a portion of the dashboard, wherein the dashboard has a first end and a second end,
      a chain system disposed within the dashboard, and
      a chain connection member disposed through the slide groove and extending through the dashboard; and
    a bracket configured to be slideably connected to the chain system through the slide groove, wherein the bracket is configured to be shuttled between the first end and the second end via the slide grove.

13. The recreational vehicle of claim 12, further comprising a workstation coupled to the slide groove.

14. The recreational vehicle of claim 13, wherein the workstation includes a work surface.

15. The recreational vehicle of claim 12, further comprising a display device coupled to the bracket.

16. The recreational vehicle of claim 15, further comprising a control center electrically coupled to the display device.

* * * * *